Patented Sept. 5, 1950

2,521,108

UNITED STATES PATENT OFFICE 2,521,108

SOLUTIONS FOR USE IN EMBALMING

John S. Williams, Lancaster, Pa.

No Drawing. Application June 25, 1948,
Serial No. 35,289

4 Claims. (Cl. 27—22)

The present invention relates to stable solutions, and particularly to solutions adapted, after suitable dilution, if desired, as a blood solvent for use in flushing out the blood from cadavers and with formaldehyde added as embalming fluids.

The object of this invention is to provide the embalmer with solutions which will keep the blood of a cadaver in a freely liquid condition, so that it can be readily drained from the body.

The embalming solutions contain formaldehyde or a formaldehyde body, and with this omitted the solution (preferably in a diluted condition) can be used for flushing the blood out of cadavers, before injecting the embalming fluid therein.

A particular object of this invention is to provide the embalmer with blood solvent fluids by which, due to the absence of coagulation of the proteins of the blood during the early stages of the embalming process, he can eliminate from the corpse all or substantially all of the blood.

The present invention is in major part a continuation of my copending application Serial No. 577,726, filed February 13, 1945, now Patent No. 2,507,236 dated May 9, 1950, in which is claimed a composition of these components in somewhat different proportions.

The total composition contains sodium metaphosphate, preferably sodium hexametaphosphate, sodium citrate, an alkali such as sodium carbonate, and a wetting and penetrating agent preferably sulphonated castor oil. The embalming solution also contains a formaldehyde body. These components are all dissolved in water.

The formaldehyde can be used in embalming fluids, in the form of the usual "formalin" namely commercial aqueous solution of formaldehyde of about 40% concentration, which usually contains some methanol and often contains a small amount of formic acid which of course in the final composition will be neutralized by the alkali.

The formaldehyde body is omitted from the blood solvent (i. e. the solution to be used for flushing the blood from cadavers), and the injection of this is followed by injecting the same solution plus a formaldehyde body (preferably an aqueous solution of formaldehyde, e. g. Formalin) into the blood vessels of the cadavers to be embalmed. It will be understood that the undertaker can purchase the solution without formaldehyde added (i. e. the blood solvent), and can add commercial formaldehyde solution to this, in a ratio of 50:50 (or other desired ratio between 4:1 and 1:3, depending on the needs of the particular case), e. g. to get about 8% to 30% of formaldehyde in the embalming fluid. Or instead of the usual 40% formaldehyde solution, he could employ an equivalent amount of formaldehyde solution of some other strength, or he could use paraformaldehyde.

The most suitable formula which I have devised for embalming, contains the following:

| | Parts |
|---|---|
| Sodium hexametaphosphate | 1 |
| Sodium citrate | 13 |
| Sodium carbonate | 20 |
| Sulphonated castor oil (M. D. grade) | 10 |

The above components can be dissolved in enough water (e. g. 62 parts) to give 100 parts of solution. To this solution I add formaldehyde (e. g. in the form of a solution of about 40% strength) in such amounts as to give a mixture containing preferably about 8% to about 20% of actual formaldehyde. This mixture is the full strength arterial embalming solution. One volume of this mixture will usually be diluted with 10 to 20 volumes (e. g. 15 volumes) of water by the undertaker or embalmer, at the time of use.

In the embalming solution (or concentrate) the proportion of the components can be varied more or less. Thus the sodium hexametaphosphate may be 1 part or somewhat less. The sodium citrate may be from about 7 parts to about 13 parts, preferably about 13 parts. The sodium carbonate may be from about 10 parts to 20 parts, preferably about 20 parts. The sulphonated castor oil (of the special kind referred to) is preferably about 10 parts. The formaldehyde may be 8 to 30 parts, preferably about 20 parts. These components are all dissolved in water. This same variation (with the formaldehyde omitted) is permissible in the blood solvent concentrate for use prior to embalming.

The percentage of hexametaphosphate can be varied; I prefer to use enough of this to render the solution miscible with tap water, well water, etc., without giving any cloudiness. The amount used can, in many cases, be 0.5%. This component has strong detergent and penetrating properties, in solution. Hence I prefer to use about 1%, usually. In this way, the solutions (including those given below) can be diluted with large volumes of water, even unusually hard water, without giving cloudiness to the diluted solutions.

For use in flushing out the blood vessels of a cadaver, I dissolve in water, the following, to give what I call "blood solvent":

| | Parts |
|---|---|
| Sodium hexametaphosphate | 1 |
| Sodium citrate | 13 |
| Sodium carbonate | 20 |
| Sulphonated castor oil | 10 |

The amount of water may be (with the above quantities of substances) 56 parts. The pH of this solution is between 9 and 10. Tested after standing for three years, the pH had not changed. This solution can be diluted with 10 to 20 times (usually I prefer to use about 15 times) its volume of water, for injection into the large arteries, to flush out the blood, a large vein being opened to allow drainage.

To the undiluted blood solvent solution, when it is to be used for making embalming fluid for injection into the arteries of a corpse, I add the formaldehyde body preferably as "Formalin", i. e. aqueous formaldehyde solution of about 40% strength, usually containing 12–20% of methanol, preferably in such amounts as to give 10–20% of actual formaldehyde in the mixture. The pH of the mixture containing 10% of formaldehyde (made by adding commercial solution of formaldehyde) was found to be about 9. When enough of the formaldehyde solution was added to give 20% actual formaldehyde in the mixture, the pH was about 8.5. Both of these solutions were tested after standing three years, and the pH had not changed. This shows the solution to be stable.

In these compositions, the sodium citrate acts to prevent undesirable reactions of the formaldehyde, during storage of the solutions. It also acts (particularly in alkaline solutions) as an anti-coagulant of proteins in blood or serum. The sodium carbonate gives a mildly alkaline condition to the solutions. Each of these is an important factor. The hexametaphosphate helps to stabilize the solutions and prevents cloudiness on diluting the solutions with tap water or other hard water. Also it adds to the penetrating properties of the solution. It is well known to be a powerful detergent. The sulphonated castor oil should (before use) have all free sulphuric acid carefully neutralized by an alkali. It gives the solutions increased penetrating power. Preferably I use a grade of sulphonated castor oil known as M. D. grade, having a pH of 8 to 8.2, i. e. the sulphonated castor oil is alkaline. The common grades of sulphonated castor oil are often acid in reaction (pH 3 to 6, more or less), and are far less satisfactory since a part of the sodium carbonate added would be neutralized.

For injection into the body cavities of the cadaver, I preferably prepare a stronger solution, e. g. 1 part of blood solvent and 2 to 3 parts of 40% Formalin, to give a mixture containing 26 to 30% of formaldehyde. This gives what I term the "cavity fluid". I prefer to inject this solution, or say a solution containing about 25 to 30% of formaldehyde, without dilution, into the body cavities of the corpse. Here also the relative proportions of the solution are subject to variation as above described. If desired, the 20% solution of formaldehyde (arterial fluid, or 1 part blood solvent and 1 part Formalin) can be used as the cavity fluid.

The entire composition is, except as above indicated, free from methanol and similar alcohols, which is a great advantage especially in the blood solvent although in the embalming fluids (arterial fluid and cavity fluid) Formalin containing usual amounts (12–20%) of methyl alcohol is suitable for use.

In practice I find it advisable to add a small amount of phenol phthalein to the various solutions, which gives a deep purple color thereto. Using high grade phenol phthalein I add one level teaspoonful to each 15 gallons of the solution. This however is optional.

The solutions preferably are filtered, after being prepared, unless already perfectly clear. All of the solutions, made as above described are stable, over long periods, e. g. samples have been kept for three years, and the pH after such storage time has been found not to have changed, and even after such long storage no precipitation is seen. The solutions should not be allowed to freeze.

While in ordinary embalming in the blood vessels, I prefer to dilute the blood solvent and arterial fluid, one volume to say 15 volumes of water, it will be understood that when decomposition in the corpse has already progressed to an unusual degree, I would use the solutions considerably stronger, even up to full strength.

It will be understood that in the arterial fluid and cavity fluid, in place of Formalin, I could employ an equivalent amount of paraformaldehyde, but this is unnecessary, and the latter is more expensive.

Prior to my invention, most embalming solutions as sold on the market were acid in reaction. Formaldehyde has long been used in embalming solutions. But, especially in acid solutions, formaldehyde is a most powerful coagulant for proteins. In alkaline solutions, sodium citrate acts as a powerful anti-coagulant of proteins and as above stated prevents loss of formaldehyde by oxidation.

In the blood solvent, which is used ahead of the embalming fluid, there is no methyl alcohol or other coagulant of proteins, and also there is present, alkali carbonate and alkali citrate.

It is important to use the minimum amount of formaldehyde, in a large volume of aqueous solution in embalming a body, to drive out the blood and blood serum from the body, as fully as possible. Preferably I inject about one gallon of diluted blood solvent and then about 3 gallons of the diluted embalming fluid into an average sized corpse (adult). The injection of the diluted embalming fluid is preferably continued until the body is completely cleared, i. e. until the discolorations caused by blood are eliminated. This means that the fluid has been distributed all over the body.

It is important to note that I do not use, in my embalming fluids, methyl formate, phenolic bodies or aldehydes containing more than one carbon atom, or acids. Such substances have heretofore been used in many of the embalming solutions, and I find the same to be highly injurious therein. In the blood solvent, I do not have wood alcohol present, which is a protein coagulant. Hence I can flush out the blood more completely, from the corpse.

The solution is without injury to rubber, or rubber compositions, or plastic articles, or to iron, steel, or enamel.

When used in embalming, this composition (with or without the formaldehyde) does not react with the mineral constituents of the body, hence leaves the skin clean and creamy white. Acid solutions heretofore used largely attack the mineral matter in the body, which tends to give a gray ashen appearance to the body. Due to these facts, the blood solvent and embalming solutions of the present invention, allow the undertaker to obtain (with much less work) far better, more life-like bodies, than when using any of the other embalming solutions heretofore in use.

In my opinion, it is due to the more complete elimination of the blood and blood serum, from the body, without coagulation of proteins by the blood solvent, that I can produce better, more presentable bodies, than when using the old embalming fluids.

An advantage of all the above formulas, for the purposes indicated is the fact that these solutions are not inactivated by the presence of proteins (e. g. blood or blood serum).

In the above description, I have mentioned sodium salts. Obviously the corresponding compounds of potassium can be substituted, in equivalent amounts.

In the above I have referred to sulphonated castor oil as the preferred penetrating agent in the several formulas. There are, as is well known, certain sulphonated or sulphated organic materials, which have come on the market as "wetting agents." Some of these which I have tried out can be used as substitutes for some or all of the sulphonated castor oil, but I find the latter to be generally preferable. Fairly satisfactory results have been secured by the use of sodium lauryl sulphate, and similar sulphated wetting agents.

I claim:

1. An embalming solution, which contains as its essential constituents, an alkali metal metaphosphate in amount sufficient to prevent the development of turbidity on diluting said solution with 10 to 20 times its own volume of hard water, said solution also containing alkali metal citrate, alkaline sulphonated castor oil and an alkali metal carbonate sufficient to give the solution a pH above 8, and containing formaldehyde, such solution being free from phenolic bodies, and free from methyl formate, such solution being stable in storage for at least three years.

2. An embalming fluid concentrate which is a solution containing an alkali metal metaphosphate, an alkali metal citrate, alkaline sulphonated castor oil, formaldehyde and alkali carbonate in amount sufficient to give the solution a pH above 8, all dissolved in water, which solution is free from phenolic bodies and free from methyl formate, and which solution is stable in storage.

3. An embalming fluid concentrate, in liquid form, containing the following ingredients:

Alkali metal hexametaphosphate, 0.5 to 1 part
Alkali metal citrate, about 7 to about 13 parts
Alkali metal carbonate, about 10 to about 20 parts
Alkaline sulphonated castor oil, about 10 parts all dissolved in water, such solution containing from 8 to 30% of formaldehyde and being suitable, when diluted, for use as an arterial embalming fluid, and being suitable when undiluted for injection into the body cavities of a cadaver, such fluid being free from phenolic bodies and free from methyl formate, and having a pH substantially above 8, and being stable in storage for at least three years.

4. A solution adapted to serve as a solvent for formaldehyde, to produce an embalming fluid, which comprises the following:

Alkali metal hexametaphosphate, 0.5 to 1 part
Alkali metal citrate, about 7 to about 13 parts
Alkali metal carbonate, about 10 to about 20 parts
Alkaline sulphonated castor oil, about 10 parts all dissolved in water and being free from phenolic bodies and free from methyl formate, such solution being stable for at least three years.

JOHN S. WILLIAMS.

REFERENCES CITED

The following references are of record in the file of this patent:

UNITED STATES PATENTS

| Number | Name | Date |
|---|---|---|
| 1,956,515 | Hall | Apr. 24, 1934 |

OTHER REFERENCES

"Embalming Fluids," by S. Mendelsohn, pub. 1940 by Chemical Publishing Co., N. Y. C.